UNITED STATES PATENT OFFICE.

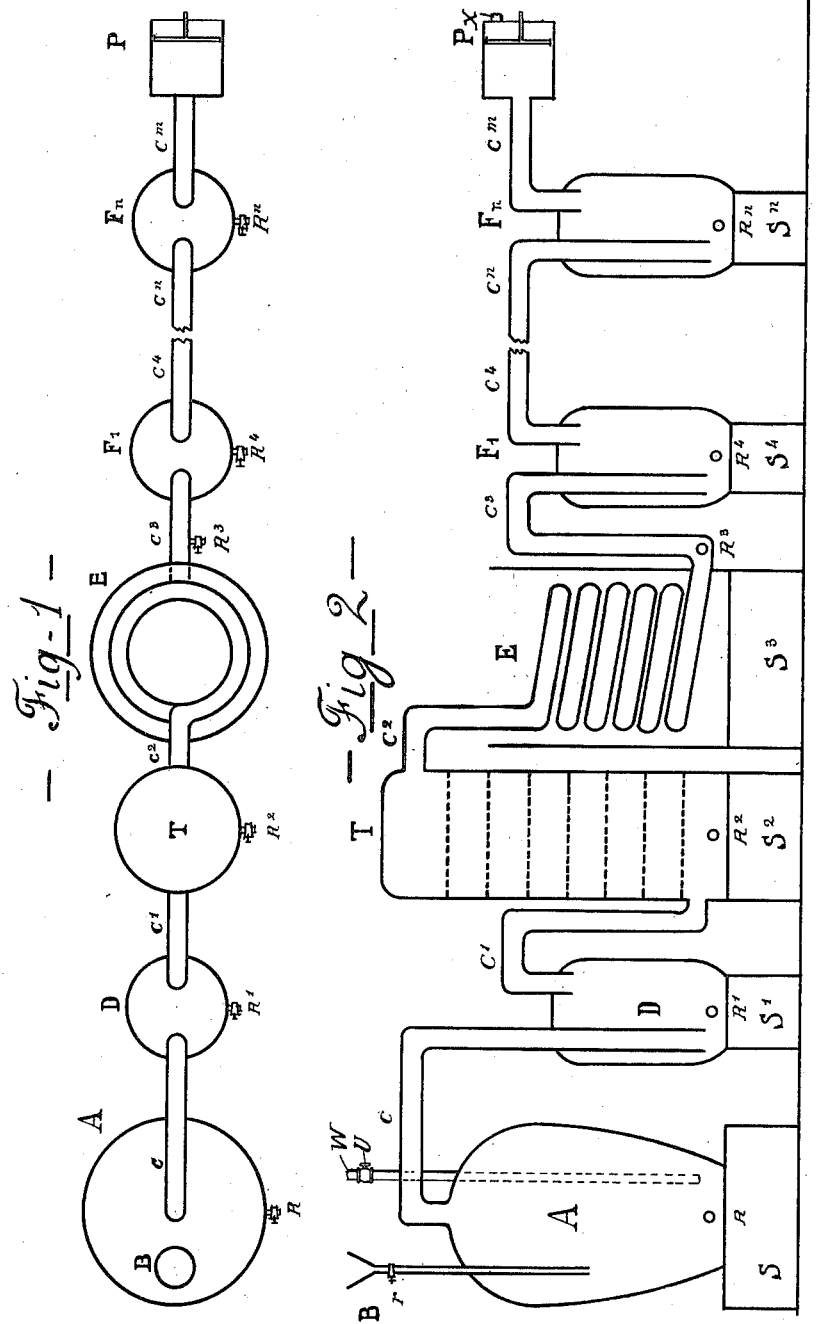

PHILIPPE AUGUSTE GUYE AND GEORGES DARIER, OF GENEVA, SWITZERLAND, AND ALLART VAN VLOTEN, OF HAARLEM, NETHERLANDS.

PROCESS OF MANUFACTURE OF ALKALINE AND EARTHY-ALKALINE NITRATES.

1,036,833.  Specification of Letters Patent.  Patented Aug. 27, 1912.

Original application filed June 25, 1910, Serial No. 568,838. Divided and this application filed March 30, 1912. Serial No. 687,343.

*To all whom it may concern:*

Be it known that we, PHILIPPE AUGUSTE GUYE and GEORGES DARIER, citizens of the Republic of Switzerland, residing at Geneva, Switzerland, and ALLART VAN VLOTEN, a subject of the Kingdom of the Netherlands, residing at Haarlem, Netherlands, have invented new and useful Improvements in Processes of Manufacture of Alkaline and Earthy-Alkaline Nitrates, of which the following is a specification, and this application is a division of our application for Letters Patent of the United States filed June 25, 1910, Serial No. 568,838, upon requirement of division made by the United States Patent Office.

It has been known for a long time that, in order to completely convert alkaline chlorids into corresponding nitrates, it is necessary to heat them several times with an excess of concentrated nitric acid (*cf.* Fresenius, *Quantitative Analysis*, Paris, 1909, L. p. 160–162). Under these conditions, aqua regia (nitrohydrochloric acid) is disengaged, at the same time that a large part of the nitric acid in excess decomposes into oxids of nitrogen or distils; the same is true when calcium chlorid is being converted into nitrate of calcium. In studying more closely these various transformations, the following observations have been made and have led to the process which forms the object of the present application for patent. These experiments have shown, first, that even with an excess of from 40 to 50 per cent. of nitric acid (containing 36 to 37% $NO_3H$), relatively to the theoretical proportions, a portion of the sea salt (4 to 12%) still escapes from the transformation; with more dilute acids slightly more favorable results have been obtained. If, on the other hand, a great excess of salt is employed, only about $\frac{7}{10}$ths of the nitric acid is converted into nitrate. With chlorids of potassium and calcium reacting in theoretical proportions with nitric acid, at the same concentrations, the results are more favorable; about $\frac{9}{10}$ths of the nitric acid employed is obtained in the form of nitrates of potassium or of calcium. These results have led to a still closer study of the causes which limit the conversion of the nitric acid into nitrate of sodium when said acid is caused to react with sea salt. It was first determined that nitric acid of weak concentrations (below 35 per cent.) gave better results, and then that the conversion is more complete when the operation is conducted at a lower temperature, and when the nitric acid is maintained at a certain degree of dilution as long as the elimination of hydrochloric acid lasts. In practice this result is obtained by carrying on the reaction at a temperature not exceeding 80° C. To give an idea of the efficacy of this method of operation, some results obtained are given below by way of example, calculated in nitric acid converted into nitrate of sodium, by reaction with sea salt:

| Pressures | 730 mm. | 200 mm. | 100 mm. | 22 mm. |
|---|---|---|---|---|
| Product | 73% | 76% | 80% | 93% |
| Temperature of evaporation | 99° C. | 80° C. | 70° C. | 40–50° C. |

It will be seen from these results that a portion of the nitric acid always escapes from the conversion; it issues from the apparatus either in the form of free nitric acid or in the form of nitrous vapors and aqua regia (containing probably oxids of nitrogen $NO_2$, $N_2O_3$, $NO$ and the gas NOCl); in both cases these products are mixed with an excess of hydrochloric acid and water; the proportion of nitrous vapors and of aqua regia becomes negligible, if the reaction is conducted at a sufficiently low temperature. The products thus disengaged can not be used as they are; in order to render them utilizable, it is advantageous to cause them to pass over a column of solid chlorid of sodium, in which there is formed a fresh quantity of nitrate, so that, at the exit from the said column, there is recovered, by condensation of the gaseous product, an aqueous solution, more or less diluted, of hydrochloric acid containing only traces of nitric acid. To facilitate the recuperation of the nitrous vapors, the introduction of air or of oxygen into the column of recuperation is useful. There has therefore been based upon all the new observations mentioned above, a process of converting aqueous nitric acid into alkaline or earthy-alkaline nitrates, consisting in causing the aqueous acid to react with the corresponding chlorids, the process being characterized by:

(1) the employment of dilute nitric acid of a concentration lower than 35 per cent. $NO_3H$, maintained as far as possible at these feeble concentrations during the entire duration of the operation; (2) conducting the operation at a temperature not exceeding 80° C.; (3) the recuperation of the hydrochloric acid in the form of an aqueous solution. This third step is accomplished by carrying over, by a current of air, the hydrochloric acid formed; the latter, charged with vapors of nitric acid, or of its products of decomposition, passes into apparatus containing solid salt. This solid salt fixes, in the form of nitrate, the greater part of the nitrate products carried over. Finally the aqueous hydrochloric acid is condensed in large part to a density approximately equivalent to that of the nitric acid employed. The crude nitrate of sodium obtained is easily separated by crystallization from the chlorid which accompanies it.

In the accompanying drawing we have illustrated, diagrammatically, and conventionally, an apparatus suitable for practising our invention, where sodium chlorid is the alkaline chlorid to be converted into the corresponding nitrate.

In the said drawing, Figure 1 is a top plan view, and, Fig. 2 a longitudinal sectional view of such suitable apparatus.

In the said drawing the reference letter A designates a vessel which, after the desired pressure, or vacuum (the terms being often used as convertible) has been obtained by means of the vacuum pump P, is heated, preferably by steam, or otherwise suitably, into which is introduced the nitric acid and the sodium chlorid, through the funnel B which is provided with a controllable valve $r$. In this vessel we understand the following reaction takes place:

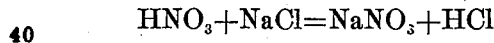

$$HNO_3 + NaCl = NaNO_3 + HCl$$

The letter D designates a condensation tower interposed between the vessel A and the chlorid tower T. This condensation tower serves to retain the liquid products carried off from the vessel A by the vapors of water and of hydrochloric acid, the froth, etc., conducted thereinto by means of the conduit C. From the condensation tower D, the vapors, which consist of a mixture of water vapor (steam), gaseous hydrochloric acid, and a slight quantity of unconverted nitric acid, and of nitrous vapors in very small proportion, pass through the conduit C' into the chlorid tower T, upon the plates of which (shown in dotted lines) solid sodium chlorid has been disposed. The nitrous products are retained in this tower. The products issuing from the tower T are a mixture of vapors of water and hydrochloric acid and they are conducted by the conduit $C^2$ into the condenser E. The condensed product is collected through the stop cock $R^3$. The acid vapors which escape condensation pass through the towers F' and $F^n$ being conducted by conduits $C^3$, $C^4$, $C^n$. These towers F' and $F^n$ contain either water or milk of lime to avoid sending out into the atmosphere any gas which may still contain free hydrochloric acid.

The letters R, R', $R^2$, $R^3$, $R^4$ and $R^n$ designate the valved outlets for the vessel A, condensation tower D, chlorid tower T, condenser E and the towers F' and $F^n$.

The letters S, S', $S^2$, $S^3$, $S^4$ and $S^n$ designate pedestals for suitably supporting the parts as shown.

The current of air for carrying the hydrochloric acid, charged with vapors of nitric acid, or of its products of decomposition, may be supplied by means of a tube W opening into the vessel A, and provided with a regulating valve U, suction being exerted for the maintenance of the current of air by the pump P. The gas HCl, not recovered in the apparatus, E, F'—$F^n$, is expelled by the pump P into a pipe X communicating with the pump cylinder from whence it may be allowed to escape to atmosphere or to apparatus for recovering and preserving the same, with which, however, this invention has nothing to do.

What we claim is:

1. A process for manufacturing nitrates consisting in subjecting alkaline or alkaline-earthy chlorids to nitric acid diluted at least to 35% $NO_3H$, maintaining such degree of dilution as far as possible, carrying on the reaction of the acid on the salts at a temperature not exceeding 80° C., and carrying off the hydrochloric-acid by means of a current of air.

2. A process for manufacturing nitrates consisting in subjecting alkaline or alkaline-earthy chlorids to nitric acid diluted at least to 35% $NO_3H$, maintaining such degree of dilution as far as possible, carrying on the reaction of the acid on the salts at a temperature lower than 80° C., under atmospheric pressure, carrying off the hydrochloric-acid by means of a current of air, and conducting the vapors into the presence of a solid salt of the nature of the chlorid treated.

In testimony whereof we have hereunto set our hands in presence of two subscribing witnesses.

PHILIPPE AUGUSTE GUYE.
GEORGES DARIER.
ALLART van VLOTEN.

Witnesses for Philippe Auguste Guye and Georges Darier:
  CH. EUG. GUYE,
  F. VULLIER.
Witnesses for Allart van Vloten:
  H. W. WHITNEY,
  O. B. SHARP.